(12) United States Patent
Kopperud (10) Patent No.: US 11,051,622 B2
(45) Date of Patent: Jul. 6, 2021

(54) BACK REST TO BE USED WITH SEAT OR CHAIR

(71) Applicant: Knut Einar Kopperud, Oslo (NO)

(72) Inventor: Knut Einar Kopperud, Oslo (NO)

( * ) Notice: Subject to any disclaimer, the term of this patent is extended or adjusted under 35 U.S.C. 154(b) by 0 days.

(21) Appl. No.: 16/619,332

(22) PCT Filed: Jun. 5, 2018

(86) PCT No.: PCT/NO2018/050147
§ 371 (c)(1),
(2) Date: Dec. 4, 2019

(87) PCT Pub. No.: WO2018/226103
PCT Pub. Date: Dec. 13, 2018

(65) Prior Publication Data
US 2020/0093271 A1    Mar. 26, 2020

(30) Foreign Application Priority Data

Jun. 6, 2017 (NO) .................................. 20170920

(51) Int. Cl.
*A47C 7/42* (2006.01)
*A47C 7/46* (2006.01)
(Continued)

(52) U.S. Cl.
CPC .............. *A47C 7/425* (2013.01); *A47C 7/465* (2013.01); *A47C 7/021* (2013.01); *A47C 7/0213* (2018.08);
(Continued)

(58) Field of Classification Search
CPC .. A47C 7/42; A47C 7/46; A47C 7/425; A47C 7/465; A47C 7/14; A47C 7/021; A47C 7/0213; B60N 2/663
See application file for complete search history.

(56) References Cited

U.S. PATENT DOCUMENTS 2,107,880 A    2/1938  Wilsdorf
2,582,115 A *  1/1952  Goodeve ................ A47C 7/425
                                              297/230.11
(Continued)

FOREIGN PATENT DOCUMENTS

CA     2187827       4/1997
EP     0 011 379     5/1980
(Continued)

OTHER PUBLICATIONS

International Search Report dated Sep. 11, 2018 in corresponding International Application No. PCT/NO2018/050147.
(Continued)

*Primary Examiner* — Syed A Islam
(74) *Attorney, Agent, or Firm* — Wenderoth, Lind & Ponack, L.L.P.

(57) ABSTRACT

Back rest to be used in association with a chair or a seat providing an adaptable convex back support for individual adjustment. The back rest comprises a plate shaped body that is bent into a curved shape by use of a tensioning device. The back rest can be used to increase comfort while seated, for example at the office or during travels, or to prevent or relieve back strain and ache as a result of being seated over longer periods or having back problems. The back rest is portable and fits into a backpack or handbag, and can be set up in a conventional chair, for example a seat in an airplane, waiting area, or office chair.

15 Claims, 6 Drawing Sheets

(51) Int. Cl.
    *A47C 7/02* (2006.01)
    *B60N 2/66* (2006.01)
    *A47C 7/14* (2006.01)
(52) U.S. Cl.
    CPC .................................. *A47C 7/14* (2013.01);
        *A47C 7/42* (2013.01); *A47C 7/46* (2013.01);
                                       *B60N 2/663* (2015.04)

(56) References Cited

U.S. PATENT DOCUMENTS

| | | | | |
|---|---|---|---|---|
| 2,621,714 | A * | 12/1952 | Kiwad | B60N 2/66 |
| | | | | 297/118 |
| 3,038,176 | A * | 6/1962 | Stone | A47C 7/742 |
| | | | | 297/452.44 |
| 3,556,589 | A * | 1/1971 | Messier | A47C 7/425 |
| | | | | 297/230.12 |
| 3,813,148 | A * | 5/1974 | Kraus | A47C 7/425 |
| | | | | 297/230.14 |
| 4,231,135 | A * | 11/1980 | Fradin | A47C 7/021 |
| | | | | 16/225 |
| 4,350,388 | A | 9/1982 | Weiner | |
| 4,679,848 | A | 7/1987 | Spierings | |
| 5,190,347 | A * | 3/1993 | Shiow-Lan | A47C 7/425 |
| | | | | 297/230.11 |
| 5,385,390 | A | 1/1995 | Freeman et al. | |
| 5,403,067 | A * | 4/1995 | Rajaratnam | A47C 7/46 |
| | | | | 297/230.11 |
| 6,007,572 | A | 12/1999 | Baldwin | |
| 6,186,594 | B1 | 2/2001 | Valiquette et al. | |
| 6,959,964 | B1 * | 11/2005 | Zapf | A47C 7/425 |
| | | | | 297/230.12 |
| 7,651,163 | B2 * | 1/2010 | Jaskot | A47C 7/425 |
| | | | | 297/284.5 |
| 8,261,384 | B2 * | 9/2012 | Batiste | A47C 7/425 |
| | | | | 5/634 |
| 9,033,416 | B1 | 5/2015 | Vanderhorst et al. | |
| 9,295,337 | B1 * | 3/2016 | Bavli | B64D 11/00 |
| 9,433,298 | B2 * | 9/2016 | Bryer | A47C 7/0213 |
| 9,782,009 | B2 * | 10/2017 | Backer | A47C 7/383 |
| 10,791,841 | B2 * | 10/2020 | Seo | A47C 3/029 |
| 2002/0175551 | A1 | 11/2002 | Hsia | |
| 2006/0255646 | A1 | 11/2006 | Davis | |
| 2008/0163427 | A1 * | 7/2008 | Howe | A47C 20/023 |
| | | | | 5/634 |
| 2011/0233977 | A1 * | 9/2011 | Ku | A47C 7/383 |
| | | | | 297/230.13 |
| 2011/0254333 | A1 * | 10/2011 | Taichman | A47C 7/46 |
| | | | | 297/230.1 |
| 2012/0023663 | A1 | 2/2012 | Batiste et al. | |
| 2014/0300157 | A1 | 10/2014 | Halliday et al. | |
| 2015/0102647 | A1 | 4/2015 | Grove | |
| 2015/0238018 | A1 | 8/2015 | Backer et al. | |
| 2018/0235374 | A1 * | 8/2018 | Kroll | A47C 27/146 |

FOREIGN PATENT DOCUMENTS

| | | |
|---|---|---|
| WO | 01/97656 | 12/2001 |
| WO | 2015/073700 | 5/2015 |

OTHER PUBLICATIONS

Norwegian Search Report dated Jan. 6, 2018 in corresponding Norwegian Application No. 20170920.

* cited by examiner

BACK REST TO BE USED WITH SEAT OR CHAIR

TECHNICAL FIELD OF THE INVENTION

The present invention relates to a replaceable back rest suitable to be used in association with chairs or seats. The back rest comprises a plate shaped body having inherent flexibility, allowing the body to be bent into an arched or curved shape. A tensioning device attached to the plate shaped body is used for adjusting the shape or curvature of the arched shape.

BACKGROUND OF THE INVENTION

Todays life modern people spend much time sitting, for example during working hours, during longer travel, either by train, planes or car, with limited possibilities of moving the body to any reasonable extent.

Moreover, seats in cars, trains or planes are standardized, intended to fit any of the travelers on a one-size-fits-all-basis. As a consequence, seating may strain the back muscles and out the possibility of moving during travelling in seats and chairs, given a general shape, configured to fit all travelers. As a consequence, the seats or chairs are designed in a way making them unpleasant or uncomfortable to use for longer periods, causing strain to the person's back. Moreover, due to a less active life and a more sedentary life, the number of people suffering from strained back problems is increasing.

Various types of cushions, often specifically designed for use when travelling, are on the market. These have various shapes and varying degree of support. Some are inflatable to take up little space when not in use and also allowing the user to determine the softness of the cushion. Other types of back supports available on the market are supports to be used while seated in an office chair. Such back supports typically comprise a rigid frame with a soft mesh or fabric providing flexibility to the back support placed on the seat of the chair and leaning towards the back rest of the chair. Such back supports are typically of a one-size-fits-all design. Some car seats offers adjustable back support built into the chair.

SUMMARY OF THE INVENTION

An object of the present invention is to enable a good posture and relieve the stress and strain on the back while seated.

Furthermore it is an object to provide a back support that enables specific adaption for the individual user. The back rest may be used by people experiencing back pain while seated, and also by people who want to prevent back ache, strain and increase comfort while seated.

Another object of the present invention is to prevent build-up of muscular strain and back pain as a consequence of sitting in seats over longer periods.

It is an object of the present invention to provide a portable back support for use in association with a conventional seat or chair or in association with a chair without a built-in back rest, for example a bench.

Another object is to enable increased comfort while seated over longer periods, for example while seated at work.

Moreover, it is an object of the present invention to provide improved ergonometric position and comfort during travelling, for example by car, plane or bus.

Yet another object is to provide a portable back support that is small enough to be carried in a handbag or small bag while on the go.

A further object is to provide a portable back support that is easy and fast to set up and dismantle, providing a simple solution to ensure a good posture and relieve stress or strain in the back while seated for example while travelling, where the user will be seated in various different places along the journey, i.e. waiting area, airplane, train, bus.

Further, it is an object to provide a portable back support adapted to fit into a back pack or handbag and that provides the possibility for individual adjustment.

A further object of the invention is to provide a back support or rest that may overcome the deficiencies caused by seats made on a "one-size-fits-all"-basis.

Yet another object of the invention is to provide a back rest that may serve as basis for other type of arrangements, such as surfaces that may secure enhanced local blood circulation or massage during longer periods of sitting, enhancing the sitting comfort.

The objects of the invention are achieved by a back rest as defined by the independent claim, while alternatives, variants and embodiments are defined by the dependent claims.

According to the invention, a back rest or support to be used in association with a seat or a chair is achieved, comprising a plate shaped body having inherent flexibility and allowing the body to be bent into an arched or curved shape, said plate shaped body having a tensioning device for adjusting the shape or curvature of the arched shape. The plate shaped body comprises two plate shaped elements and a connecting element allowing the two plate shaped elements to be connected along adjoining edges and to be arranged into one plate shaped body, and a motion constraint associated with the connecting element. The tensioning device is connected to each of the plate shaped elements. By having two plate shaped elements forming the back rest body, the back rest may be taken apart or folded when not in use in order to minimize its size and fit into small or regular size backpacks or handbags. The plate shaped body may comprise a hinge element or a transition element between the two plate shaped elements, arranged along adjoining sides or across the line of partition between the elements forming the back rest, the hinge element or transition part allowing the back rest to pivot or to be rotated to a folded state and to an unfolded state, or to be assembled into one single unit to be curved or arched and wherein the back rest further comprises a motion constraint limiting rotation of one of the two plate shaped elements relative to the other. The motion constraint may be arranged on one of the two plates and may comprise a section extending over the hinge or transition part and overlapping at least partly the other plate when unfolded, such that the motion constraint limits rotation of one of the two plate shaped elements relative to the other in unfolded state. This allows the back rest to be more or less aligned in the unfolded state, and to be folded when not in use. The motion constraint may be configured to limit one of the two plate shaped elements to rotate through a maximum relative angle of approximately 180 degrees relative to the other plate shaped element when unfolded. Swinging rotation of the back rest is in such case therefore limited to an angular range between 0 degrees, due to the two plates interfering in the folded state, and approximately 180 degrees, due to the motion constraint in the unfolded state. As the two plates may be allowed to fold until 0 degrees, the back rest has a flat shape when folded, making it easy to fit into a back pack or handbag. The tensioning device may be arranged on the same side of the unfolded back rest as the motion constraint, thus preventing further rotation around the hinge, but producing an adjustable, overall arched surface of the back rest when in unfolded state.

Alternatively, the two plates may be separate, and where the jointing of the two plates is obtained by means of a transition part for example in the form of interlocking grooves and tongues on the adjoining edges of the plates. One of the plate shaped elements may comprise one or more grooves on one edge of the plate and the other plate may comprise corresponding complimentary shapes or tongues on one edge for interlocking with the groove(s) of the other plate, allowing one of the plates to be inserted into the other for forming a fixed, but releasable joint in the middle region of the assembled back rest.

The plate shaped body may be, at least partly, made of a material with inherent pliant or flexing properties, allowing the body to be bent when exposed to a bending force imposed by the tensioning device and return to its original shape when the bending force is released.

Moreover, the plate shaped body may be less flexible in its middle region than at the free ends.

According to an embodiment of the invention, the plate shaped body may comprise at least two attachment points spaced apart on the body and connected by the tensioning device, the tensioning device having a manipulating mechanism for adjustment of the length of the active or tensioned part of the tensioning device so as to pull the two free ends of the plate shaped body towards each other to obtain an adjustable convex curvature. The adjustment may be of a stepless or stepwise type. The tensioning device may be in the form of one or more straps and wherein the manipulating mechanism is configured to affect the tension in the strap(s), so that the surface of the plate shaped body bends on the opposite side of the tensioning device to obtain a convex curvature.

Furthermore, the tensioning device may have marks indicating various levels of tension, allowing the user quickly to reset the curvature in a preferred position. The motion constraint may be configured such that one of the plates, at the adjoining edge in the vicinity of the hinge or split line between the two parts, is provided with a restraining surface preventing the adjoining edge of the adjoining plate from rotation beyond an angle of approximately 180 degrees, thereby serving as a locking surface. The back rest may comprise a plate, slidably arranged on the back side of one of the two plate shaped elements, and configured to be moved to overlap the hinge and into a recess arranged on the other plate shaped element for providing added stiffness to the plate shaped body and/or for preventing further relative rotation between the two plate shaped elements when unfolded.

Alternatively, the motion constraint may comprise a stopper pin or plate rotatably arranged on the back side of one of the two plate shaped elements for rotation about an axis normal to the surface of the plate shaped element and arranged so that the pin or plate may be in a position allowing free rotation of the two plate shaped elements relative to each other, or in a position overlapping the other plate and thus preventing further unfolding rotation between the plate shaped elements.

A surface of at least one of the plates may be provided with areas of a material with resilient properties on the side of the back rest that is in contact with the users back.

According to another embodiment of the invention, at least a part of a surface of the back rest can have massage features incorporated into the plate.

According to yet another embodiment of the present invention, the back rest may comprise a seating pad onto which the user can sit, the seating pad being configured to be connected to the lower end of the plate shaped body with an angle limited to approximately 90 degrees relative to the plate shaped body, eliminating the need for having a near vertical surface to support the back rest.

BRIEF DESCRIPTION OF THE FIGURES

Embodiments of the present invention will now be described, by way of example only, with reference to the following diagrams wherein.

DETAILED DESCRIPTION OF EMBODIMENTS DISCLOSED IN THE DRAWINGS

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further particular features, structures or characteristics may be combined in any suitable manner or in one or more embodiments. Moreover, throughout the description below, the same reference number is used for the same or similar features.

Figure 1:
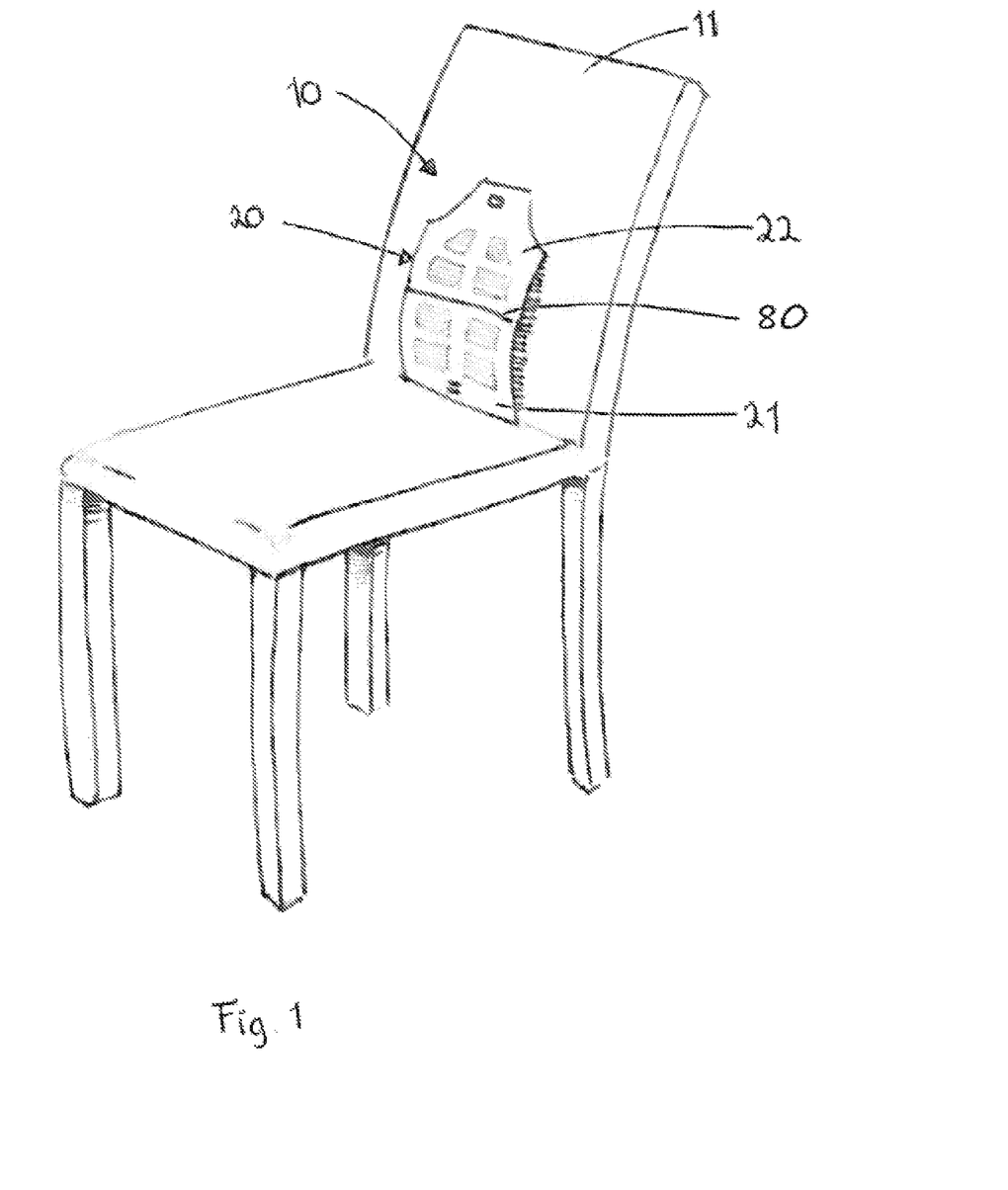
FIG. 1 shows schematically an embodiment of a backrest according to the invention positioned in a conventional seat or chair.

FIG. 1 shows schematically one embodiment of a back rest 10, according to the invention, set up in a chair 11 of a conventional type. The back rest comprises a plate shaped body 20, comprising a lower plate 21 and an upper plate 22, the two plates being connected by a connecting element 80 allowing the two plate shaped elements 21, 22 to be connected along adjoining edges and arranged into one plate shaped body 20. When assembled into one plate shaped body 20, the back rest must comprise a motion constraint 60 (not shown in FIG. 1) providing rotational rigidity at least in one orientation, i.e. it may be allowed to pivot or rotate into a folded state, but must in such case be limited to unfold until a given relative angle between the two plate shaped elements. This motion constraint 60 may be incorporated into the connecting element 80 or it may be an added element supporting the connecting element 80. The connecting element may be a hinge, allowing the two plates to rotate or pivot relative to each other, so that the back rest may be folded in order to reduce its size when not in use. A motion constraint 60, limiting rotation at a given relative angle between the two plate shaped elements 21, 22 when unfolded may be added to obtain a rigid plate shaped body 20 allowed to be bent into an arched shape. The connecting element 80 may alternatively be a fixed connecting means, such as interlocking groove and tongue, allowing the two parts to be fixed in a more or less aligned position relative to each other by a linear movement of one plate with respect to the other, securing engagement between the grooves of the one body in the complimentary tongue(s) of the other body. In this case, the motion constraint 60 is incorporated into the connecting element 80, and when assembled, the plate shaped body is rotationally rigid by virtue of the structure of the connecting element 80. The back rest may later be taken apart when not in use and stored on top of each other, thereby reducing its size for storing. The connecting element 80 is not shown in detail, but the purpose is to allow the two plates to be folded or collapsed into a minimized size when not in use; variants of connecting elements 80 for this purpose will be illustrated by way of example below. The back rest 10 is designed to be placed against a user's lumbar region of the back, and, as shown in this embodiment, the back rest is positioned between the user's back and the back rest of a conventional chair 11, for example a seat in an airplane. The back rest 10 has a convex shape about the horizontal axis facing in use towards the user's back, as shown in FIG. 1. The plate shaped body 20 can be initially flat or curved and have inherent pliant properties as a result of a combination of material properties, shape, structure and thickness of the plate, reinforced sections or stiffened sections or areas, allowing it to be bent into an adjustable convex shape, by means of a tensioning device 70 (not shown in FIG. 1), and later return to its original shape. Various materials are suitable for this purpose, for example variants of plastic or metal.

In FIG. 1, the back rest 10 is placed onto the seat of the chair 11 against the chair's back rest; however, the user is free to position the back rest 10 at any height on the back rest of the chair 11 as it will be held in place once the user leans back on the chair 11.

The connecting element 80 allows the back rest 10 to be folded or collapsed when not in use, so as to minimize its size, making it easier for the user to bring the back rest 10 in a backpack or hand bag. The folding possibility is not essential for the back rest 10 to function as an adjustable back rest, and a back rest 10 according to the invention may have a plate shaped body 20 comprising only of one single plate shaped element without the possibility of folding, but preferably with a tensioning device according to the present invention.

In FIG. 1, the plate shaped body is near rectangular in shape, however with cutouts at the upper corners creating a concave end contour on each side at the top end. The shape of the plate shaped body 20 illustrated in FIG. 1 is only one of many possible shapes that the plate shaped body 20 can have, and such cutouts at the top are not a requirement for a back rest according to the invention. The shape may for example be designed to obtain a certain bending stiffness or a certain appearance.

The word "hinge system or hinge" in this document refers to a mechanism or a solution that allows two elements to swing about an axis (fold or unfold) relative to each other. The mechanism can be a separate part attached to each of the elements or an integrated part of one or both of the elements or with an elongated indent or groove in a single plate element, extending across the single plate, forming a pivot line, thus allowing one part to be folded with respect to the other. Variants of the hinge 50 will be presented later in this document.

Instead of a hinge, the connecting element 80 may be in the form of two complementary elements, one element formed as guiding slots or recesses formed on one plate shaped element 21, 22 and the other element forming an extension of the other plate shaped element 21, 22, the extension(s) being configured to be inserted in the guiding slot(s), thereby allowing the two elements to function as a unit to be curved.

Figure 2:
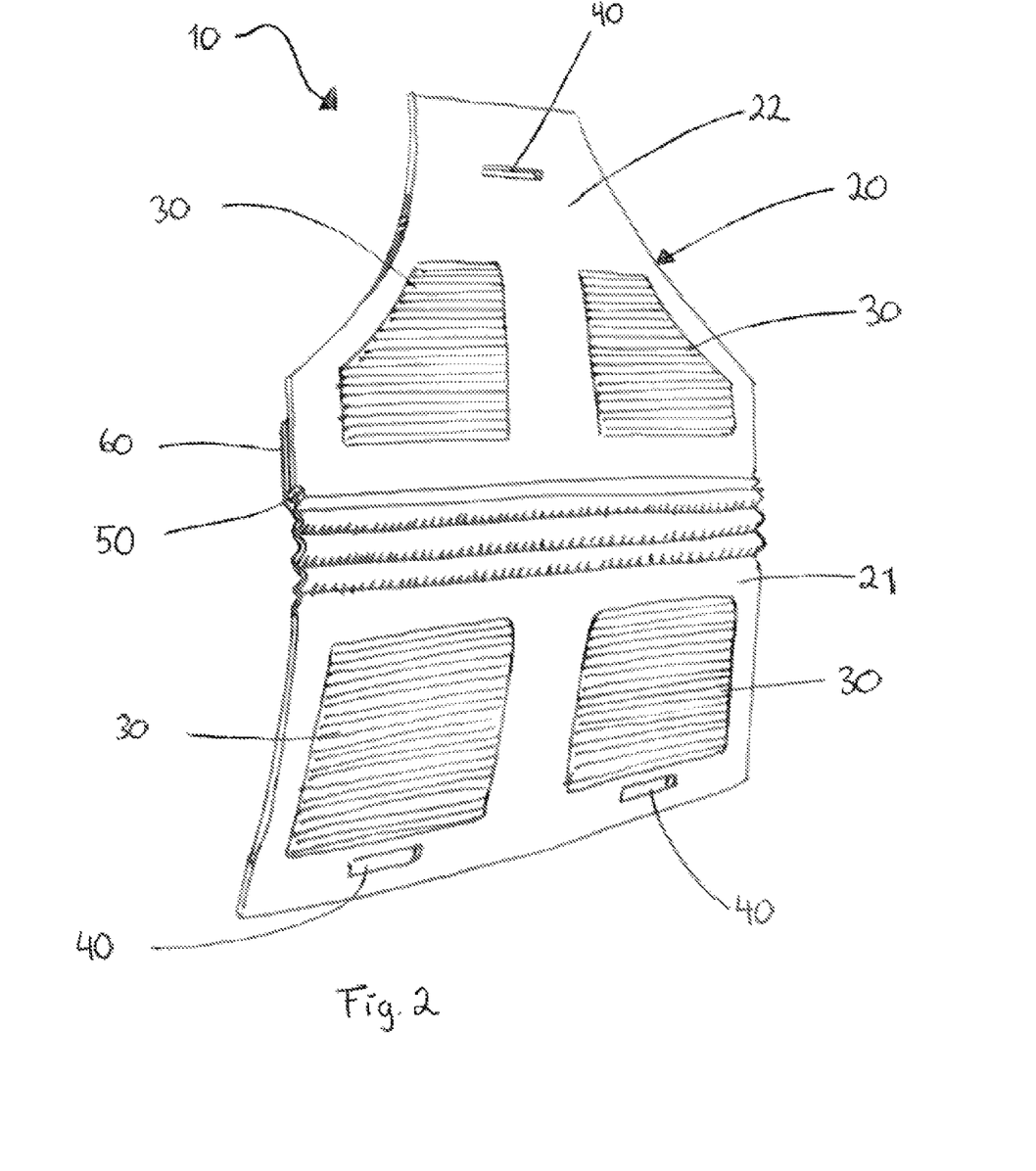
FIG. 2 shows schematically a front view, partly in perspective, of another embodiment of a backrest according to the invention.

FIG. 2 shows a possible embodiment of a back rest 10 according to the invention where the plate shaped body 20 comprises two plate shaped elements; a lower plate 21 and an upper plate 22, the two plates being connected by a hinge 50. In this embodiment of the invention, the hinge comprises a spindle running through a hollow section created by the adjoining edges of the plates. The hinge 50 allows the back rest 10 to be folded flat when not in use, reducing its extension while still maintaining a flat shape.

Furthermore, FIG. 2 shows a motion constraint 60, preventing the lower plate 21 from further rotation about the hinge 50 by having an extension on the lower plate 21 overlapping the hinge 50 and further part of the upper plate 22, thus acting as a restraining surface. Alternatively, this extension may be arranged on the upper plate 22, overlapping the lower plate 21. This overlap may also, depending on the geometrical extension and material properties, provide added stiffness to this area of the back rest. This added stiffness can contribute to a change in curvature and to prevent undesirable collapse in tensioned state which may be caused by fatigue. As the back rest will experience a great number of tensioning cycles, the material may become weakened and it will be beneficial to provide reinforcement in this most exposed area in order to avoid this effect. In FIG. 2, the plates are shown with the maximum allowed relative angle due to the motion constraint 60, approximately 180°.

Furthermore in FIG. 2, the lower plate 21 and the upper plate 22 have areas of padding 30 on the front, i.e. the side of the plate in contact with the user's back. The padding 30 may consist of a resilient material that is softer than the plate 20 for comfort purpose, and that may provide friction against the user's back so as to prevent it from sliding. The padded areas can also be used to create a certain appearance by use of specific shapes and colors. FIG. 2 only shows one possible padding design where four areas on the back rest are covered, however many different sizes, shapes and positions can be used.

Another element shown in FIG. 2 is attachment points 40 used to attach a tensioning device 70 (not shown in FIG. 2). Three attachment points 40 are shown; two on the lower end and one on the upper end of the plate shaped body 20, thereby providing points on each side of the hinge for pulling two ends of the plate shaped body towards each other and create a convex shape, which may be adjusted by adjusting the length of the tensioned part of the straps. Alternative designs may include fewer (at least two) or more attachment points 40. The position and number of attachment points 40 can be configured to influence the stability of the back rest in tensioned state. The attachment points will determine where the pulling force from the tensioning device acts on the back rest and at least one attachment point should be arranged on each of the plate shaped elements 21, 22.

In one embodiment of the invention, the plate shaped body 20 can be designed with one or more sections of ridges and/or grooves in the surface, as can be seen in FIG. 2 on the upper part of lower plate 21. The structure of the ridges and the firmness of the material in the ridges can create various effects in terms of comfort for the user, for example soft material for padding, or firm material for a massage effect.

Figure 3:
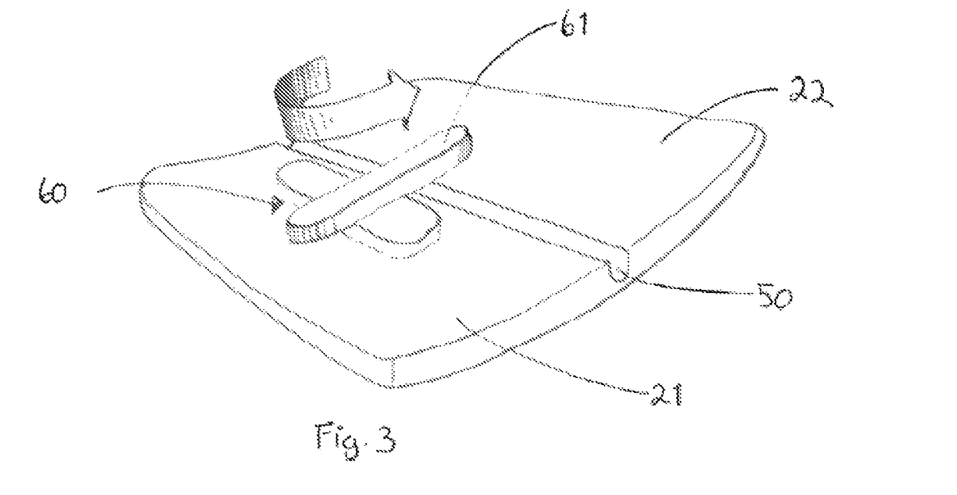
FIG. 3 shows schematically an embodiment of a motion constraint.

FIG. 3 shows a variant of a motion constraint 60 to be used on a back rest according to the invention comprising two plate shaped elements 21 and 22. In this embodiment of the invention, a rotatably arranged stopper 61 in the form of a locking pin is attached to the back of one of the plates 21 or 22 being able to rotate about an axis normal to the surface of the plate. The rotatable stopper 61 can be in a position allowing free rotation of the plates 21 and 22 relative to each other, for example parallel to the hinge, or rotated so that it overlaps the other plate and prevents rotation beyond an angle close to 180°. The stopper 61 may alternatively be in the form of a plate, also rotatably arranged in similar manner as the illustrated locking pin and covering a larger area of the back rest, thus providing a different stiffness contribution than a pin type stopper. FIG. 3 also illustrates a variant of the hinge 50 incorporated into the plate shaped body 20 where it has an elongate cleft in the plate itself, extending across the back rest body, creating a weak section, so as to obtain a pivot axis along the cleft. In order to make the joint even more rigid, two rotatable stoppers 61 may be used, positioned sideways apart along the split line 50.

Figure 4:
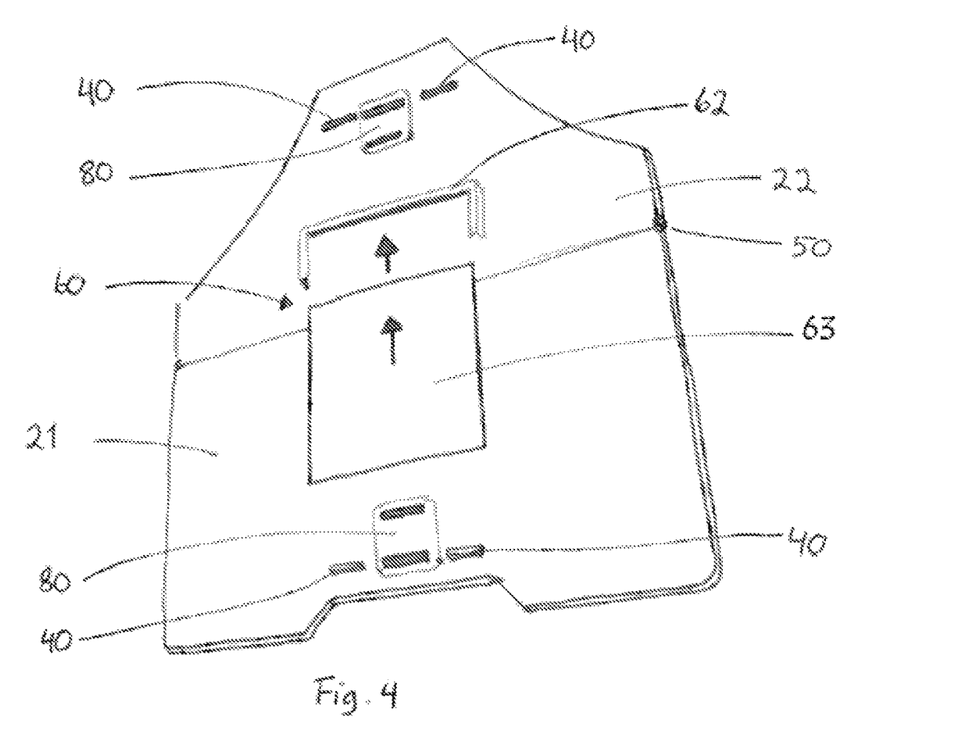
FIG. 4 shows schematically an embodiment of a stiffening plate and locking mechanism.

FIG. 4 shows a variant of a motion constraint 60 placed on the back side of one of the plates 21 or 22 and arranged so that it can be pushed to overlap the other plate. In the figure, the lower plate 21 has a stopper plate 63 that can move vertically into a recess 62 on the upper plate 22, thus preventing further rotation around the hinge 50. A stopper plate 63 as in FIG. 4 can also add stiffness to the plate shaped body 20 and may be designed so that the user can determine the stiffness and convexity by pushing the plate 63 up to the desired level into the recess 62. The plate 63 can function as a combined motion constraint and stiffening element, or it can function as an extra stiffening element in addition to a separate motion constraint such as for example the motion constraint 60 in FIG. 2. The thickness, length and width should be carefully considered to obtain the desired stiffness when the plate is pushed into position. In one embodiment, the plate is interchangeable with a plate of different thickness and/or material properties (such as for example variants of plastic or metal), i.e. different stiffening properties, for the user to choose the desired curvature. For increased stability, the width of the plate 63 may be increased to cover a larger section of the width of the plate shaped body 20.

Furthermore, FIG. 4 illustrates another element of a foldable variant of the back rest, a locking mechanism 80, where a snap lock is implemented into the upper and lower plate for keeping the back rest in folded state.

Figure 5:
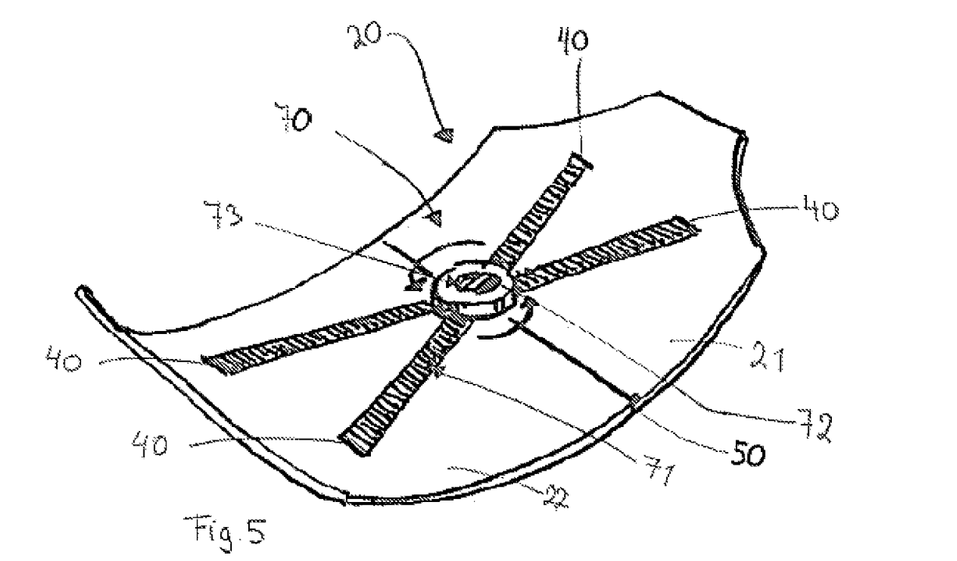
FIGS. 5 and 6 show schematically possible configurations of a tensioning device.
Figure 6:
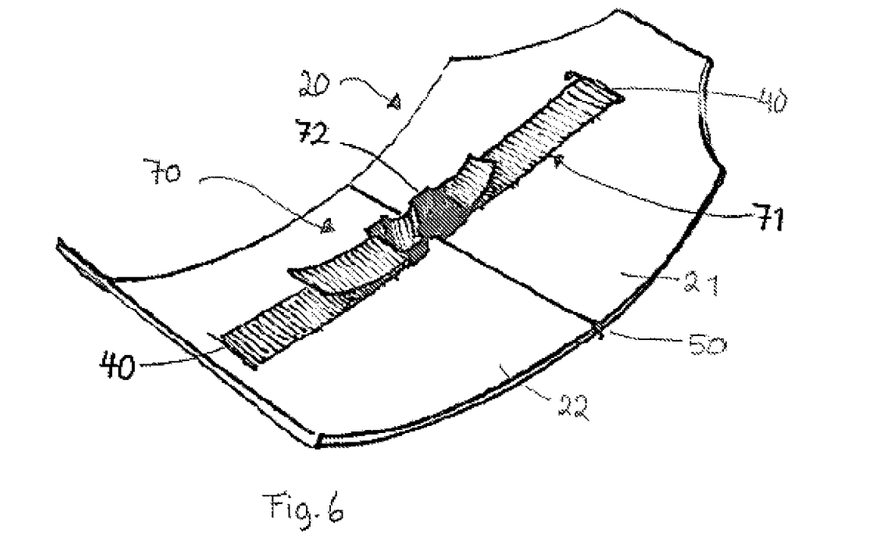

FIGS. 5 and 6 show two out of many possible solutions for bending or curving the back rest 10 into a desired curved shape. A tensioning device 70 is attached to the plate shaped body 20 through the attachment points 40. By applying tension to the tensioning device 70, the attachment points will be pulled towards each other and thus create a convex shape on opposite side of the plate. As shown in both embodiments, the attachment points 40 are located to create a pulling force acting near the top and bottom of the back rest, and at least one attachment point is located on each of the plates 21, 22. The user can adjust the convexity by adjusting the tension applied. The tensioning device 70 may, according to one embodiment of the invention, and as illustrated in FIGS. 5 and 6, be of a strap type, preferably made of a material with little or no elasticity, tensioned by a manipulating device 72 shortening the active or tensioned part of the tensioning strap 71.

Various types of manipulating devices 72 can be used. It can have a stepless or stepwise adjustment, and may include the possibility to perform adjustment in tensioned state or in relaxed state. The manipulating device 72 shown in FIG. 6 allows for both. FIG. 5 illustrates a manipulating device 72 with a release mechanism 73 in the form of a button that can be pushed in to release the tension in the strap.

Marks indicating levels of tension may be added to the tensioning device 70, for example by adding numbered lines along the strap 71, allowing the user to easily know the current level of tension or find back to a preferred level of tension.

With the straps arranged in a cross, as shown in FIG. 5, a more stable back rest can be achieved.

Figure 7:
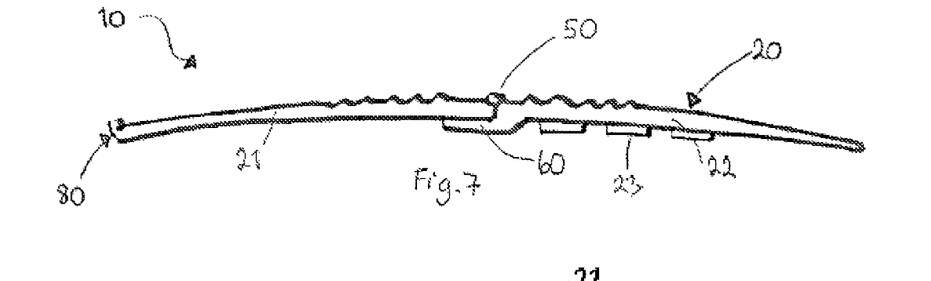
FIG. 7 shows schematically a side view of an embodiment of a back rest according to the invention.

FIG. 7 shows a possible embodiment of a back rest 10 from a side view comprising two plate shaped elements, 21 and 22, connected by a hinge 50, and where the left and right sides on the illustration represents the top and bottom of the back rest (or vice versa). The back rest is shown in unfolded state, where a motion constraint 60, in the form of an extended section on one of the plates overlapping the other, is preventing further unfolding. The motion constraint 60 can be placed on the lower plate 21 or upper plate 22, the illustration in FIG. 7 is only an example.

Figure 8:
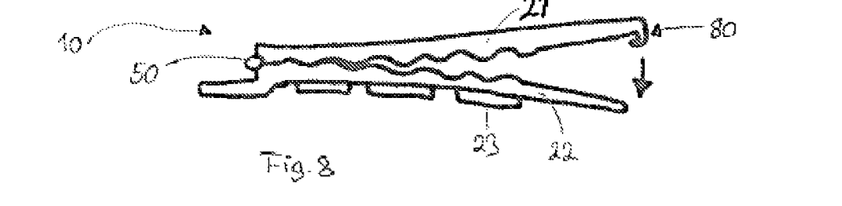
FIG. 8 shows schematically a side view of an embodiment of a back rest according to the invention being folded.

The flexibility of the plate shaped body 20 may vary at different locations on the plate so that the plate 20 is less flexible in its middle region than in the areas closer to the free ends, by reducing the thickness of the plate going from the middle towards lower and upper ends of the plate shaped body 20. The overlapping section created by the motion constraint 60, will contribute to an increased thickness and thus increased stiffness in the hinge area. The stiffness may also be modified by a local thickness increase in specific areas, as illustrated by FIGS. 7 and 8, where three stiffening elements 23 are shown. Various shapes, sizes and numbers of stiffening elements can be used, and they can be an integrated part of the plate itself or an added element fastened to the plate. By manufacturing the plate shaped element in molded plastic, such reinforcing sections can easily be integrated into the plate in various shapes, sizes and locations. Metal reinforcement rods or plates/sheets may also be integrated into the plastic body.

In FIG. 7 a locking mechanism 80 to maintain the two parts in a folded state is shown, the locking mechanism being in the form of a hook at the end of the plate on the left side in the Figure. When folding the two sections or parts of the back rest 10, the opposite end of the plate shaped body 20 will snap into the hook and keep the back rest 10 folded. A number of alternative locking mechanisms can be used to keep the back rest folded, for example variants of snap locks of hook type over the end or sides of the plate, or pin type through a hole in the other plate. One variant was also mentioned related to FIG. 4. Other locking mechanisms such as a strap or elastic band wrapped around the folded back rest 10 may also be used.

In FIG. 8 the back rest 10 is shown in folded state, ready to be locked by a hook type snap lock. In this embodiment, the corrugated surfaces on the upper and lower plates interlock as the back rest is folded and locked. Folding rotation is only limited by interference between the two plates, thus achieving a flat shape of the back rest when folded. This is especially convenient when placing the back rest in a back pack, for example next to a laptop, books, documents, or even in a laptop pocket.

Figure 9:
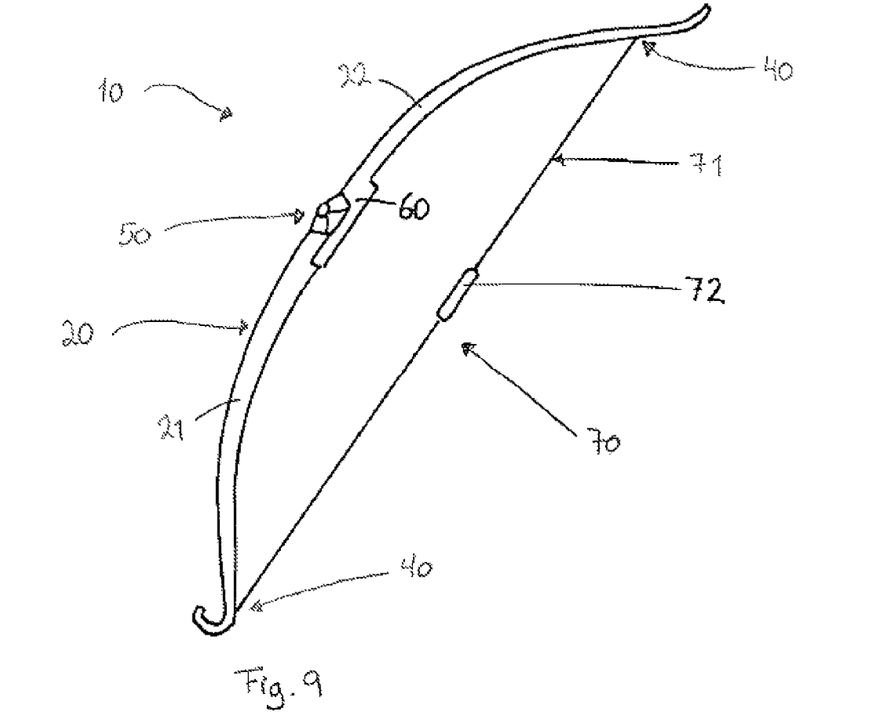
FIG. 9 shows schematically a side view of another embodiment of a back rest in assembled and tensioned state, according to the invention.

FIG. 9 illustrates a back rest 10 according to the invention in tensioned state from a side view. In this figure the tensioning device comprises a tensioning strap 71 tensioned by a manipulating device 72, thereby pulling the upper and lower ends of the plate shaped body 20 together so as to create a convex surface on the front side of the back rest 10. Further tightening the strap 71 would pull the ends of the plates closer, and influence the convex shape of the back rest 10.

In the embodiments described above, attachment points 40 for a tensioning device 70 have been described. These attachment points serve as a means for attaching a tensioning device, such as a strap, to the plate shaped body 20. The location of the attachment points 40 on the plate(s) determines where the pulling force acts on the plate, and as mentioned, number of attachment points 40 can influence the stability of the back rest 10 in tensioned state. The attachment points 40 can for example be in the form of an oblong hole in the plate 20 allowing a tensioning strap 71 to be pulled through creating a loop around the edge of the plate 20, or locked with a locking pin or similar through the tensioning strap 71 on the side of the plate opposite of the entrance side.

The back rest 10 may, when in use, be pushed into the back rest of the chair 11 it is placed on. To avoid having marks or damage to for example a fabric on the chair, the plate shaped body 20 can have a rim of soft material, for example a rubber type, on the edges in contact with the chair.

Several features may be included in the back rest 10 for added comfort for the user, such as holes for ventilation in the plate, fixed or removable padding or cushion, variants of surface texture on the plate shaped body 20 or variants of protrusions for massage purpose.

Figures 10A, 10B:
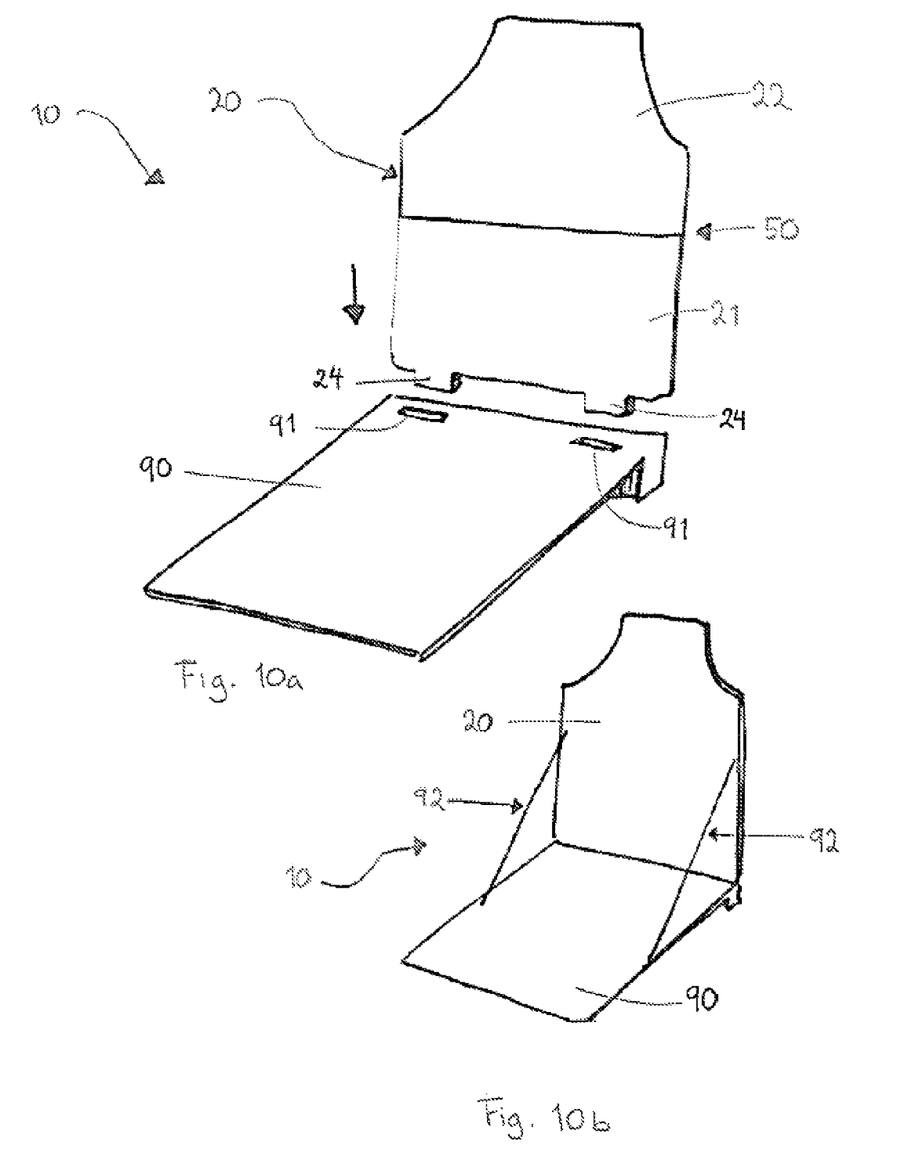
FIGS. 10a and 10b show schematically embodiments of the invention for use on a seat or stools without a built-in backrest.

FIG. 10*a* shows a variant of the back rest for use on seats that do not have a backrest, for example a bench. In this embodiment, the back rest 10 comprises a horizontal part, a seating pad 90, which is connected to the lower end of the approximately vertical plate shaped body 20. The vertical part of the back rest is in substance similar to previously described embodiments and comprises a plate shaped body 20 able to be bent into an adjustable curved shape. The seating pad 90 is placed on top of the seat of the chair and the vertical part, i.e. the plate shaped body 20, is not supported by the backrest on the chair as in previously described embodiments, but by a fixed connection to the seating pad 90 ensuring that the angle between the seating pad 90 and the plate shaped body 20 is approximately 90°. The user will sit on the seating pad 90 and lean back on the convex plate shaped body 20. The plate shaped body 20 may also in this embodiment, consist of two plate elements 21, 22 and a hinge 50, for allowing it to be folded. The plate shaped body may have one or more brackets 24 (FIG. 10*a* shown with two brackets) to be inserted into corresponding slits 91 in the seating pad 90 to create the fixed angle between the two parts.

FIG. 10*b* shows another embodiment of the back rest for use on seats that do not have a backrest. In this embodiment, the approximately vertical plate shaped body 20 of the back rest 10 is connected at its lower end to the seating pad 90. It may be connected by a hinge, allowing rotation of the plate shaped body 20 relative to the seating pad 90 about a horizontal axis on the back end of the seating pad 90 and rotation may be limited by a restraining mechanism 92, for example in the form of straps connected to the seating pad 90 ensuring the angle between the seating pad 90 and the plate shaped body is limited to approximately 90°. The vertical part of the back rest is in substance similar to previously described embodiments and comprises a plate shaped body 20 able to be bent into an adjustable convex shape.

The invention claimed is:

1. A back rest to be used in association with a seat or a chair, comprising a plate shaped body having inherent flexibility, allowing the body to be bent into an arched shape, said body having a tensioning device for adjusting the shape or curvature of the arched shape, wherein the plate shaped body comprises two plate shaped elements, a connecting element allowing the two plate shaped elements to be connected along adjoining edges and arranged into one plate shaped body, a motion constraint associated with the connecting element, and wherein the tensioning device is connected to each of the plate shaped elements.

2. The back rest according to claim 1, wherein one of the plate shaped elements comprises one or more grooves on one edge of the plate and the other plate shaped element comprises complimentary tongues along one edge of the plate for interlocking with the groove(s), allowing one of the plates to be inserted into the other to form a fixed, but releasable joint in the middle region of the assembled back rest.

3. The back rest according to claim 1, wherein the plate shaped body comprises a hinge between the two plate shaped elements arranged along adjoining sides, the hinge allowing the back rest to be in a folded state and in an unfolded state, and wherein the motion constraint is arranged on one of the two plates and comprising a section extending over the hinge and overlapping at least partly the other plate when unfolded, the motion constraint limiting rotation of one of the two plate shaped elements relative to the other in unfolded state to a maximum relative angle of approximately 180 degrees.

4. The back rest according to claim 1, wherein the tensioning device is arranged on the same side of the unfolded back rest as the motion constraint.

5. The back rest according to claim 1, wherein the plate shaped body is at least partly made of a material with inherent pliant properties.

6. The back rest according to claim 1, wherein the plate shaped body is less flexible in its middle region than at the free ends.

7. The back rest according to claim 1, wherein the plate shaped body comprises at least two attachment points spaced apart on the body, the attachment points being connected by the tensioning device, the tensioning device having a manipulating mechanism for stepless or stepwise adjustment of the length of the tensioned part of the tensioning device so as to pull two free ends of the body towards each other to obtain an adjustable convex curvature.

8. The back rest according to claim 1, wherein the tensioning device is in the form of one or more straps and wherein a manipulating mechanism is configured to affect the tension in the strap(s).

9. The back rest according to claim 1, wherein the tensioning device has marks indicating various levels of tension.

10. The back rest according to claim 3, wherein the motion constraint is configured such that one of the plates, at the adjoining edge in the vicinity of the hinge is provided with a restraining surface preventing the adjoining edge of the adjoining plate from rotation beyond an angle of approximately 180 degrees, serving as a locking surface.

11. The back rest according to claim 3, comprising a plate slidably arranged on the back side of one of the two plate shaped elements and configured to be moved to overlap the hinge and into a recess arranged on the other plate shaped element.

12. The back rest according to claim 3, wherein the motion constraint comprises a stopper pin or plate rotatably arranged on the back side of one of the two plate shaped elements for rotation about an axis normal to the surface of the plate shaped element and arranged so that the pin or plate may be in a position allowing free rotation of the two plate shaped elements relative to each other, or in a position overlapping the other plate and thus preventing further unfolding rotation between the plate shaped elements.

13. The back rest according to claim 1, wherein a surface of at least one of the plates is provided with areas of a material with resilient properties on the side of the plate that is in contact with the users back.

14. The back rest according to claim 1, wherein at least a part of a surface of the back rest has massage features incorporated into the plate.

15. The back rest according to claim 1, comprising a seating pad onto which the user can sit, the seating pad being configured to be connected to the lower end of the plate shaped body with an angle limited to approximately 90 degrees relative to the plate shaped body, eliminating the need for having a near vertical surface to support the back rest.

* * * * *